Oct. 7, 1924.
A. WOLLENSAK
TELESCOPE
Filed Nov. 17, 1922
1,510,732
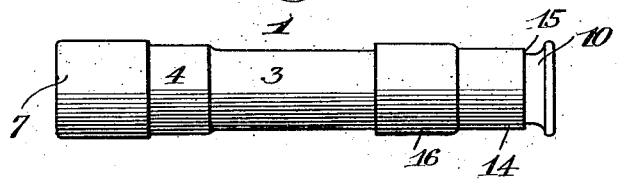
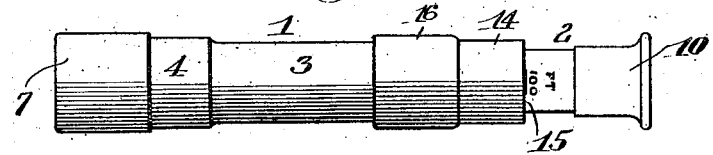
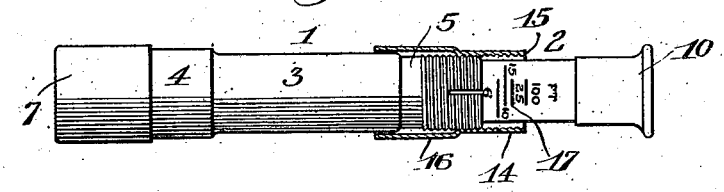
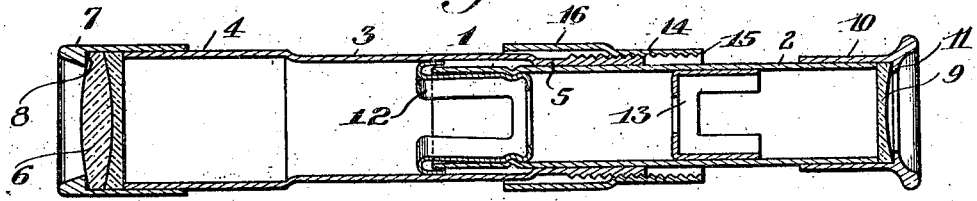
INVENTOR.
Andrew Wollensak
BY
HIS ATTORNEY Patented Oct. 7, 1924.

1,510,732

UNITED STATES PATENT OFFICE.

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK.

TELESCOPE.

Application filed November 17, 1922. Serial No. 601,582.

*To all whom it may concern:*

Be it known that I, ANDREW WOLLENSAK, a citizen of the United States, residing at Rochester, in the county of Monroe and State of New York, have invented certain new and useful Improvements in Telescopes; and I do hereby declare the following to be a full, clear, and exact description of the same, reference being had to the accompanying drawing, forming a part of this specification, and to the reference numerals marked thereon.

My present invention relates to optics and more particularly to telescopes and binoculars and it has for its object to provide an improved instrument of this character which will enable the user to extend it and set it for his particular eye without focusing it while held to the eye. Further improvements relate to providing means whereby the telescope may be used also as a simple form of range finder. To these and other ends the invention resides in certain improvements and combinations of parts all as will be hereinafter more fully described, the novel features being pointed out in the claims at the end of the specification.

In the drawings:

Figure 1 is a side view of a telescope constructed in accordance with and illustrating one embodiment of my invention the same being shown contracted or folded.

Figure 2 is a similar view of the telescope extended.

Figure 3 is a view similar to Figure 2 but partly in longitudinal section through the adjusting member and Figure 4 is an enlarged longitudinal central section through the telescope as a whole.

Similar reference numerals throughout the several views indicate the same parts.

Although the invention has a wider range of application, I have shown my improvements embodied, in the present instance, in a simple pocket telescope comprising an outer tube 1 and an inner tube 2. I construct the outer tube integrally from a tubular body to consist of a central portion 3 of the normal diameter of that body and end portions 4 and 5. The end portion 4 is relatively enlarged by expanding the metal of the tube 3 and the end portion 5 is similarly reduced to a lesser diameter by contracting the tube, so that the instrument as a whole has the usual stepped outline although it involves in the present instance only two tubes, this formation being further useful in the manner hereinafter explained.

The object or field lens 6 which is compound in the present instance is held against the end of the expanded portion 4 of the outer tube 1 as a seat by a cap 7 fitting over the tube and provided with a shoulder 8 engaging the margin of the lens on the outside. This cap is preferably cemented in place on the tube. The eye piece 9 is similarly held against the end of the inner tube 2 by a cap 10 cemented in place and having a shoulder 11 engaging the margin of the lens on the outside, which lens is shown herein as a simple lens.

The telescope is focused as usual by sliding the inner tube 2 in and out of the outer tube 1. Its bearing is in the reduced portion 5 only of the outer tube, and its inward movement is limited by the cap piece 10 abutting the end of the outer tube, as shown in Figures 1 and 3. To limit the outward movement of the inner tube I provide a thimble 12 adapted to engage a shoulder formed by junction of the portions 3 and 5 of the outer tube within which latter is a suitable diaphragm 13.

The portion 5 of the outer tube is exteriorly threaded to receive an adjustable threaded collar 14 which, by rotation, is caused to move longitudinally of the outer tube with its edge 15 projecting beyond the same but clearing the cap piece 10 so that the latter can always fold or be contracted against the end of the outer tube. A portion 16 of the sleeve is expanded to clear the intermediate portion 3 of the tube 1 and give a better grip for the fingers. I further mark in longitudinal sequence on the inner tube 2 a focusing scale 17 having indications in terms of lineal distances. In the present instance the scale runs from six feet to a hunderd feet or infinity. These markings of the scale constitute both focus indicators and distance indicators.

As a telescope, the device is used as follows: The user, disregarding the scale for the time being, focuses the telescope at his eye on an object at a known distance or say, for example, at infinity. He then rotates the sleeve 14 until its edge 15 registers with the indicator at a hundred feet as in Figure 2 and leaves it permanently so adjusted. He may now collapse the telescope as completely as before but when he has occasion to use it again he does not need to focus it at his eye but merely draws out the inner tube to give the reading stated and it is thus quickly focused. Or, he may set it at twenty-five feet or any other distance at which he estimates an object to be and it will also be in focus for him at that distance if he has estimated correctly.

As a range finder, the particularly user first focuses the telescope for his eye at infinity, as above described, adjusting the sleeve. He then focuses it at his eye independently of the scale on the object whose distance he wishes to estimate. Upon taking it from his eye the reading of the edge 15 of the adjustable sleeve on the scale 17 will give the distance of the object. In other words once the telescope is adjusted to the individual if an object does not appear in focus it is not at the distance indicated on the scale.

I claim as my invention:

1. In a telescope, the combination with an outer tube and a relatively sliding inner tube, said parts respectively carrying the elements of a lens system, of a focus indicator on one tube and a threaded sleeve on the other adapted to be set to the indicator.

2. In a telescope, the combination with an outer tube and a relatively sliding inner tube, said parts respectively carrying the elements of a lens system, of a focusing scale on one tude having indications in terms of lineal distances and an adjustable member on the other adapted to be set to the indicator.

ANDREW WOLLENSAK.